H. L. COE.
Lantern.

No. 211,320. Patented Jan. 14, 1879.

Witnesses
Chas. H. Smith
Geo. V. Pinckney

Inventor
Henry L. Coe.
per Lemuel W. Serrell
atty.

UNITED STATES PATENT OFFICE.

HENRY L. COE, OF CLIFTON, NEW JERSEY, ASSIGNOR TO MANHATTAN BRASS COMPANY, OF NEW YORK, N. Y.

IMPROVEMENT IN LANTERNS.

Specification forming part of Letters Patent No. 211,320, dated January 14, 1879; application filed October 22, 1878.

*To all whom it may concern:*

Be it known that I, HENRY L. COE, of Clifton, in the county of Passaic and State of New Jersey, have invented an Improvement in Lanterns, of which the following is a specification:

Lanterns have been made with a metallic band at the bottom of the glass, with pins entering bayonet-lock slots in the base of the lantern, and in some cases the glass has been recessed to receive spring-catches.

The nature of my said invention consists in combining with blocks riveted upon the rim of the base and the inside of the metallic cap a glass that is made with peripheral grooves, that extend from lateral grooves to stops, that limit the turning motion in placing the parts together.

By the use of blocks riveted upon the metallic parts I am enabled to accommodate the slight variations in the glasses, because the bearing is against the sides of the blocks, and there is sufficient difference between the diameter of the metal and glass parts to allow the former to spring and yield slightly to pressure of the glass against the blocks.

Figure 1:
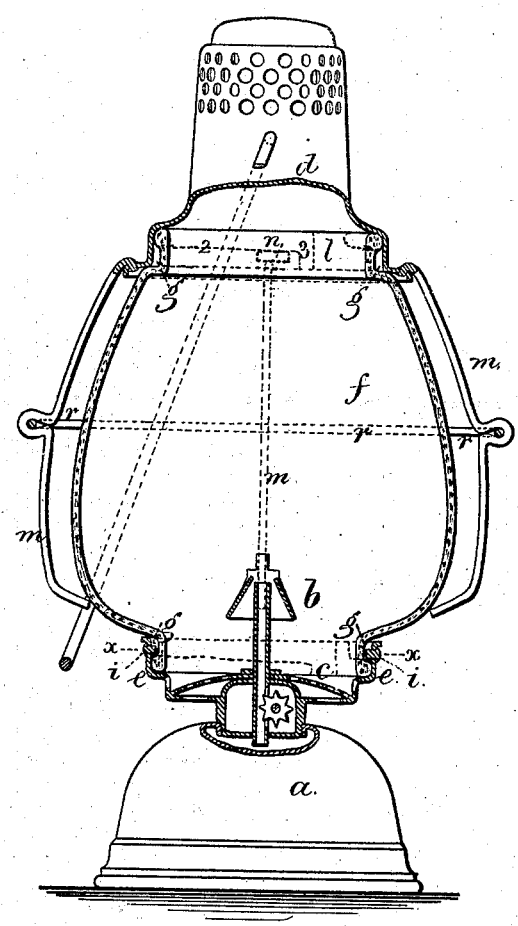
Figure 2:
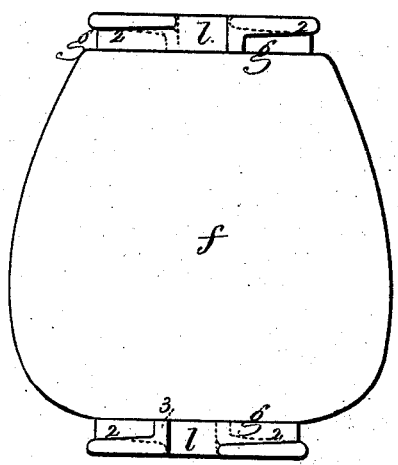
Figure 3:
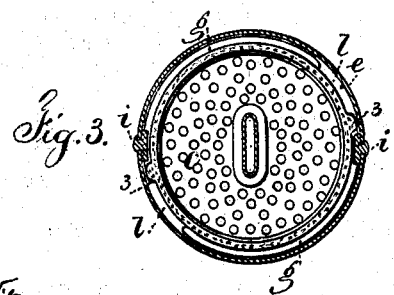

In the drawing, Figure 1 is a vertical section of the lantern. Fig. 2 is an elevation of the glass, and Fig. 3 is a section at the line $x$ $x$.

The lamp-reservoir $a$, burner $b$, air-distributer $c$, and cap $d$ are of any usual character, except that there is a rim or cylindrical flange, $e$, to the air-distributer, and upon the inside there are blocks $i$ $i$ riveted at opposite sides, and there are similar blocks $n$ within the lower part of the cap $d$.

The globe or glass $f$ is of any desired shape. It has two short cylindrical ends provided with bayonet-lock grooves $g$, that receive the blocks $i$ or $n$, and the surface, 2, that is nearest the end of the glass is inclined, so as to act with the blocks to draw the parts firmly when set together and turned.

The grooves $l$ extend from the grooves $g$ to the ends of the glass to admit the blocks $i$ or $n$, and the portions 3 of the glass form stops at the end of the grooves $g$, to prevent the parts being turned too far.

The metal portions $e$ and $d$ are slightly larger in diameter than the cylindrical ends of the glass, so as not to bind the same, and the bearing against the glass is the surfaces of the blocks $i$ and $n$, and hence the metal portions yield slightly to any inequalities of the glass.

The guard is made of the wires $m$, that extend downwardly from the cap $d$ around the glass, and they are connected by the hoop or ring $r$, and their lower ends grasp the glass, and the guard yields as moved over the bulge of the glass in pressing the same to place or removing it.

I do not claim the grooves in the glass, nor the studs of the metal rim when pressed up of the metal of said rim and forming a bayonet-lock connection for the glass; neither do I claim the combination of these parts.

I claim as my invention—

In combination with the lantern-glass having L-shaped grooves at opposite sides, the blocks $i$ or $n$, riveted to the interior of the rim $e$ or cap $d$, and projecting inwardly sufficiently to bear against the glass at the bottom of the grooves and hold the same by friction without the glass being confined by the rim or cap itself, substantially as set forth.

Signed by me this 14th day of October, A. D. 1878.

HENRY L. COE.

Witnesses:
GEO. T. PINCKNEY,
CHAS. H. SMITH.